US008506786B2

(12) United States Patent
Shim et al.

(10) Patent No.: US 8,506,786 B2
(45) Date of Patent: Aug. 13, 2013

(54) METHOD FOR RECOVERY OF RESIDUAL ACTINIDE ELEMENTS FROM CHLORIDE MOLTEN SALT

(75) Inventors: Joon-Bo Shim, Daejeon (KR); Do-Hee Ahn, Daejeon (KR); Seung-Woo Paek, Daejeon (KR); Si-Hyung Kim, Kyunggi-do (KR); Sang-Woon Kwon, Daejeon (KR); Kwang-Rag Kim, Daejeon (KR); Han-Soo Lee, Daejeon (KR)

(73) Assignees: Korea Atomic Energy Research Institute, Daejeon (KR); Korea Hydro & Nuclear Power Co., Ltd., Seoul (KR)

( * ) Notice: Subject to any disclaimer, the term of this patent is extended or adjusted under 35 U.S.C. 154(b) by 573 days.

(21) Appl. No.: 12/763,512

(22) Filed: Apr. 20, 2010

(65) Prior Publication Data

US 2011/0017601 A1 Jan. 27, 2011

(30) Foreign Application Priority Data

Jul. 21, 2009 (KR) ........................ 10-2009-0066455

(51) Int. Cl.
*C25C 3/34* (2006.01)
*G21C 19/48* (2006.01)

(52) U.S. Cl.
USPC ........................ 205/43; 205/47; 976/DIG. 280

(58) Field of Classification Search
USPC .................................................. 205/47, 43
See application file for complete search history.

(56) References Cited

U.S. PATENT DOCUMENTS

| | | | | |
|---|---|---|---|---|
| 4,814,046 | A | * | 3/1989 | Johnson et al. .................. 205/47 |
| 4,880,506 | A | * | 11/1989 | Ackerman et al. .............. 205/44 |
| 2007/0158196 | A1 | * | 7/2007 | Kang et al. ....................... 205/48 |

OTHER PUBLICATIONS

Iizuka, et al., "Actinides Recovery from Molten Salt/Liquid Metal System by Electrochemical Methods", J. Nucl. Mat., 247, 183 (1997).
Kinoshita et al., "Separation of Uranium and Transuranic Elements from Rare Earth Elements by Means of Multistage Extraction in LiCl-KCl/Bi System," J. of Nucl. Sci. Tech., 36(2), 189 (1999).
ANL's Chemical Technology Division Annual Technical Report 1994, ANL-95/24, p. 91 (1995) (excerpts).

* cited by examiner

*Primary Examiner* — Patrick Ryan
*Assistant Examiner* — William Leader
(74) *Attorney, Agent, or Firm* — Baker & Hostetler LLP

(57) ABSTRACT

A method for recovery of residual actinide element from chloride molten salts that are formed after electro-refining and/or electro-winning of a spent nuclear fuel and include actinide elements and rare-earth elements is provided. The method comprises conducting electrolysis using a liquid cadmium cathode (LCC) in the chloride molten salt that is formed after electro-refining and/or electro-winning of a spent nuclear fuel and contains rare-earth elements and actinide elements; electro-depositing the actinide elements contained in the chloride molten salt on the LCC in order to reduce a concentration of the actinide elements; and adding a $CdCl_2$ oxidant to the chloride molten salt containing the LCC-metal alloy in order to oxidize the rare-earth elements co-deposited on the LCC, thereby forming the rare-earth chlorides in the chloride molten salt.

4 Claims, 5 Drawing Sheets

METHOD FOR RECOVERY OF RESIDUAL ACTINIDE ELEMENTS FROM CHLORIDE MOLTEN SALT

CROSS-REFERENCE TO RELATED APPLICATIONS

This application claims priority to foreign Patent Application KR 10-2009-0066455, filed on Jul. 21, 2009, the disclosure of which is incorporated herein by reference in its entirety.

FIELD OF THE INVENTION

The present invention relates to a method for recovery of residual actinide elements from chloride molten salts and, more particularly, to a method for recovery of residual actinide elements from a chloride molten salt.

BACKGROUND OF THE INVENTION

Pyroprocess is a dry process for treatment of nuclear fuel using chloride molten salts at a high temperature in order to reduce the volume of a spent metal nuclear fuel and reuse the fuel materials. Actinide elements such as uranium (U) and transuranics (TRU) etc. remaining in a molten salt are recovered by electro-refining that uses a solid electrode to isolate pure uranium and by electro-winning that uses a liquid metal electrode to recover uranium and transuranics. For instance, the spent metal nuclear fuel is introduced into an anode in a LiCl—KCl eutectic salt, electric power is applied thereto to melt uranium and transuranic elements, and such uranium and transuranic elements are subjected to electro-deposition on an iron cathode or a liquid cadmium cathode (LCC), thereby recovering uranium and transuranic elements.

Where a large amount of nuclear fuel is subjected to electro-refining and electro-winning, nuclear fission products are accumulated in a molten salt and a process for treatment of waste molten salt is required to eliminate such fission products. A volume of high radiation level waste and an amount of actinide elements for disposal generating from pyroprocessing must be minimized as much as possible, so as to reduce environmental burden and/or problems while improving the economic advantage of the pyroprocess. However, since some actinide elements such as uranium and transuranic elements remain in the molten salt, such actinide elements should be sufficiently removed prior to the treatment process of the waste molten salt.

Conventional methods for recovery of residual actinide elements include, for example: reductive extraction, electrochemical treatment, oxidation and so forth.

In Japan, a number of studies and investigations into development of a countercurrent flow type multi-staged reductive extraction method, which has high practical applicability in order to recover residual actinide elements from waste molten salts, have been conducted at the Central Research Institute of Electric Power Industry (CRIEPI). However, it is difficult to construct a multi-staged reductive extraction apparatus that flows a molten salt and a liquid metal to face each other in three to five stages according to a countercurrent flow way and allows these materials to come into contact with each other in two phases, wherein a difference between specific gravities of both the molten salt and the liquid metal is considerably high and operation of such apparatus is complicated. Moreover, in an aspect of practical utility, when a great amount of waste molten salt generated in a large scaled pyroprocess should be treated, the foregoing multi-staged reductive extraction apparatus requires increased capacity and has difficulties in continuous operation, causing deterioration in processing rate and efficiency.

Argonne national laboratory (ANL) in the United States examined electrochemical recovery method using a Li—Cd anode material and an iron-based solid cathode. However, in such an electrochemical recovery using a solid cathode, disproportionation reaction wherein an electrodeposited metal portion reacts with a trivalent(+3) ion to produce a divalent (+2) ion unavoidably occurs, causing drastic decrease in recovery efficiency.

SUMMARY OF THE INVENTION

One aspect of the present invention advantageously provides a method for recovery of residual actinide elements from a chloride molten salt that is formed after electro-refining and electro-winning of a spent nuclear fuel and contains rare-earth elements as well as actinide elements.

Another aspect of the present invention advantageously provides a method for recovery of residual actinide elements from a chloride molten salt, that, if formed after electro-refining and/or electro-winning of a spent nuclear fuel, contains rare-earth elements as well as actinide elements, wherein this method is a hybrid process that adopts electro-winning using LCC for recovery of fuel materials used in a sodium fast reactor (SFR) for a future nuclear system and utilizes a $CdCl_2$ oxidant and LCC electrolysis, so as to recover residual actinide elements.

Embodiments of the present provide a method for recovery of residual actinide elements from a chloride molten salt, comprising: conducting electrolysis using a liquid cadmium cathode (LCC) in the chloride molten salt that is formed after electro-refining and/or electro-winning of a spent nuclear fuel and contains rare-earth elements and actinide elements; electro-depositing the actinide elements contained in the chloride molten salt on the LCC in order to reduce a concentration of the actinide elements; and adding a $CdCl_2$ oxidant to the chloride molten salt containing the LCC-metal alloy in order to oxidize the rare-earth elements co-deposited on the LCC, thereby forming the rare-earth chlorides in the chloride molten salt.

The method for recovery of residual actinide elements has various advantages, including a concentration of residual actinide elements may be decreased to 100 ppm or less by electro-depositing actinide elements remaining in the chloride molten salt, for example, waste molten salt such as LiCl—KCl eutectic salt on an LCC; an existing electro-winning apparatus and accessories thereof used for recovering uranium and transuranic fuel materials are also utilized without modification thereof, so that no additional equipment is required and an improved process with excellent convenience and simplicity is embodied, compared to conventional multi-staged reductive extraction processes currently developed in foreign countries including Japan.

Accordingly, residual actinide elements, including uranium and transuranics remaining in a waste molten salt such as LiCl—KCl eutectic salt generated after electro-refining and electro-winning of a spent nuclear fuel, may be effectively removed to obtain a residual concentration of not higher than 100 ppm, and then, recovered. Therefore, a volume of high radiation level waste generating from pyroprocessing which is a dry process for treatment of a spent nuclear fuel as well as an amount of actinide elements for disposal may be considerably decreased, thereby proposing an important technology to overcome conventional problems such as mass generation of high radiation level waste and to improve the economic advantage of the pyroprocess.

The present invention advantageously provides a considerably convenient and simple process capable of effectively removing and recovering residual actinide elements that remain in LiCl—KCl eutectic salts, compared to existing multi-staged reductive extraction processes.

BRIEF DESCRIPTION OF THE DRAWINGS

The above and other aspects, features and advantages of the present invention will be more clearly understood from the following detailed description taken in conjunction with the accompanying drawings, in which.

DETAILED DESCRIPTION

Embodiments of the present invention provide a method for recovery of residual actinide elements from a chloride molten salt that is formed after electro-refining and/or electro-winning of a spent nuclear fuel and contains actinide elements and rare-earth elements.

The above method comprises conducting electrolysis using a liquid cadmium cathode (LCC) in the chloride molten salt that is formed after electro-refining and/or electro-winning of a spent nuclear fuel and contains rare-earth elements and actinide elements; electro-depositing the actinide elements contained in the chloride molten salt on the LCC in order to reduce a concentration of the actinide elements; and adding a $CdCl_2$ oxidant to the chloride molten salt containing the LCC-metal alloy in order to oxidize the rare-earth elements co-deposited on the LCC, thereby forming the rare-earth chlorides in the chloride molten salt.

The chloride molten salt may be a LiCl—KCl eutectic salt.

The inventive method further comprises heating the chloride molten salt to 500° C. or more, preferably 500 to 700° C. in order to melt the same, before the electrolysis process wherein the LCC is used in the chloride molten salt.

The electrolysis process in the inventive method wherein the LCC is used in a LiCl—KCl eutectic salt as the chloride molten salt may be conducted at a current density of 10 to 100 $mA/cm^2$.

Alternatively, the electrolysis process in the inventive method wherein the LCC is used in a LiCl—KCl eutectic salt as the chloride molten salt may be conducted at a current density of 10 to 100 $mA/cm^2$, while using a glassy carbon as an anode material added to the chloride molten salt and generating chlorine gas at the anode.

The foregoing electrolysis process wherein the LCC is used in the LiCl—KCl eutectic salt as the chloride molten salt, is substantially conducted at a current density of 10 to 100 $mA/cm^2$ while using a glassy carbon as an anode material added to the chloride molten salt and generating chlorine gas at the anode. In this case, stepwise controlling the current density may enable recovery of actinide elements with a residual concentration of the same in the LiCl—KCl eutectic salt of not higher than 100 ppm.

Hereinafter, the present invention will be described in detail with reference to the accompanying drawings.

The present invention relates to a method for recovery of residual actinide elements from a chloride molten salt by adopting a hybrid process utilizing LCC electrolysis and a $CdCl_2$ oxidant.

Figure 1:
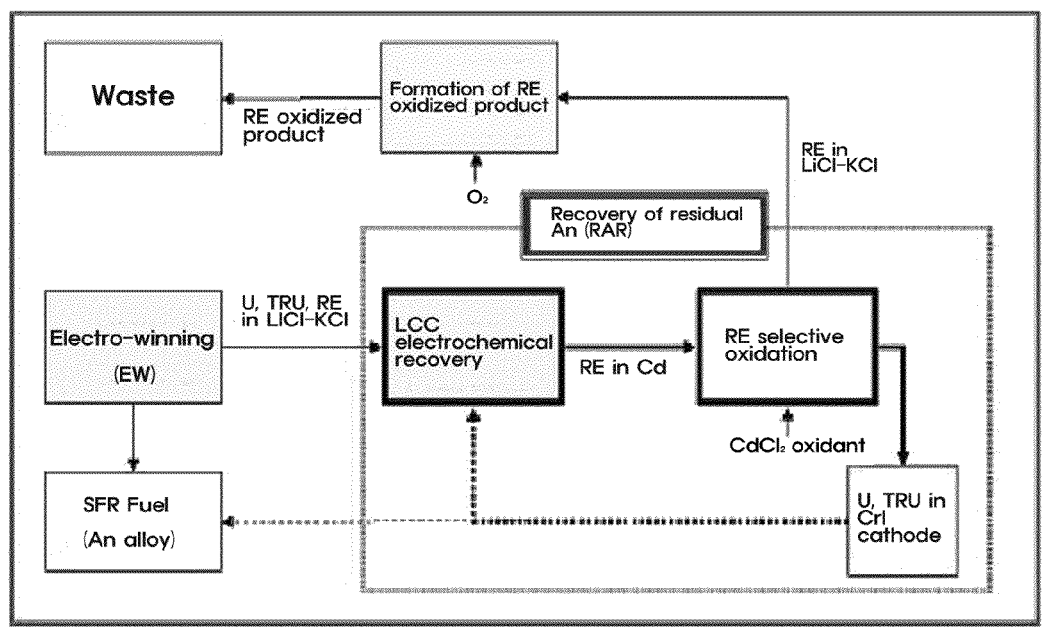
FIG. 1 is a flow diagram illustrating a process for recovering residual actinide elements by electrochemical recovery using LCC and selective oxidation of $CdCl_2$.
Figure 2:
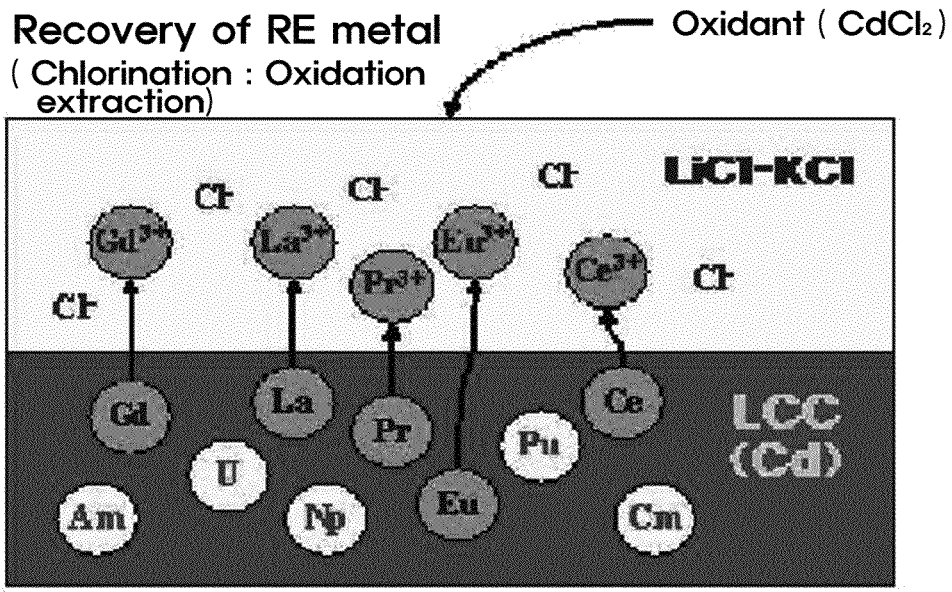
FIG. 2 is a view illustrating formation conception of rare-earth metal chlorides by selective oxidation of $CdCl_2$ in the process for recovering residual actinide elements as shown in FIG. 1.

In the foregoing method for recovery of residual actinide elements from the chloride molten salt, LCC electrolysis of waste molten salt generated after electro-winning is firstly conducted and actinide elements remaining in the waste molten salt are electrodeposited on the LCC in order to considerably decrease a residual concentration of the actinide elements in the waste molten salt. Then, some rare-earth metal excessively co-deposited on the LCC during electrochemical recovery of the actinide elements deposited on the LCC are oxidized by adding the $CdCl_2$ oxidant to the treated mixture and are extracted in the molten salt phase. The LCC with reduced content of rare-earth materials is reused in LCC electrochemical recovery of residual actinide elements and the actinide elements are removed, while the waste molten salt containing only rare-earth metals is forwarded to a salt waste treatment process (see FIG. 1 and FIG. 2).

The inventive method for recovery of the residual actinide elements has a significant characteristic in that an existing electro-winning apparatus and accessories thereof used for recovering TRU fuel materials are directly utilized without modification thereof, thus not requiring alternative equipment. Moreover, the inventive method is advantageously simplified, compared to other multi-staged reductive extraction processes developed in foreign countries including Japan.

The electrochemical recovery using LCC to recover the residual actinide elements from the waste molten salt has advantages of increasing a recovery efficiency of americium (Am) co-existing in both of divalent(+2) and trivalent(+3) states, when practically treating the used nuclear fuel.

Electrochemical recovery using a solid cathode entails an unavoidable disproportionation reaction wherein deposited metals react with trivalent ions to produce divalent ions, causing a decrease in recovery efficiency. However, LCC may considerably reduce generation capability of the disproportionation reaction, thus enhancing the recovery efficiency. Consequently, the present invention uses LCC as an electrochemical recovery cathode.

A process of oxidizing some rare-earth metals co-deposited on the LCC in the molten salt using a $CdCl_2$ oxidant and chlorinating the same has been proposed from a principle wherein rare-earth elements only are selectively oxidized and extracted by thermodynamic property based on a difference of Gibbs free energy, $\Delta G$, of formation of metal chloride (see TABLE 1).

The inventive method for recovery of residual actinide elements from a chloride metal salt was subjected to practical experiments under various conditions and, as a result of the experiments, it was found that the method for recovering residual actinide elements from the chloride molten salt under the aforementioned conditions is preferable.

Hereinafter, the present invention will be described in greater detail by the following examples and experimental examples, which are given for illustrative purposes but are not construed to restrict the scope of the present invention as defined by the appended claims.

TABLE 1

Free Energies of Formation of Chlorides at 500° C.
kJ/g – equiv. Chlorine

| Compound | $-\Delta G_f^0$ (KJ/g – equiv. –Cl) | Compound | $-\Delta G_f^0$ (KJ/g – equiv. –Cl) |
|---|---|---|---|
| KCl | 363.76 | $AmCl_3$ | 266.38 |
| LiCl | 345.27 | $CmCl_3$ | 284.99 |
|  |  | $PuCl_3$ | 261.41 |
| $LaCl_3$ | 293.62 | $NpCl_3$ | 242.91 |
| $CeCl_3$ | 287.37 | $UCl_3$ | 232.35 |
| $NdCl_3$ | 281.45 | $ZrCl_2$ | 194.18 |
| $GdCl_3$ | 273.02 | $CdCl_2$ | 136.30 |
| $YCl_3$ | 272.50 | $FeCl_2$ | 124.38 |
|  |  | $NbCl_5$ | 107.62 |
|  |  | $MoCl_3$ | 67.96 |
|  |  | $TeCl_3$ | 44.33 |
| Ions in salt phase |  | Metals in Cd phase |  |

EXAMPLES

Example 1

Figure 3:
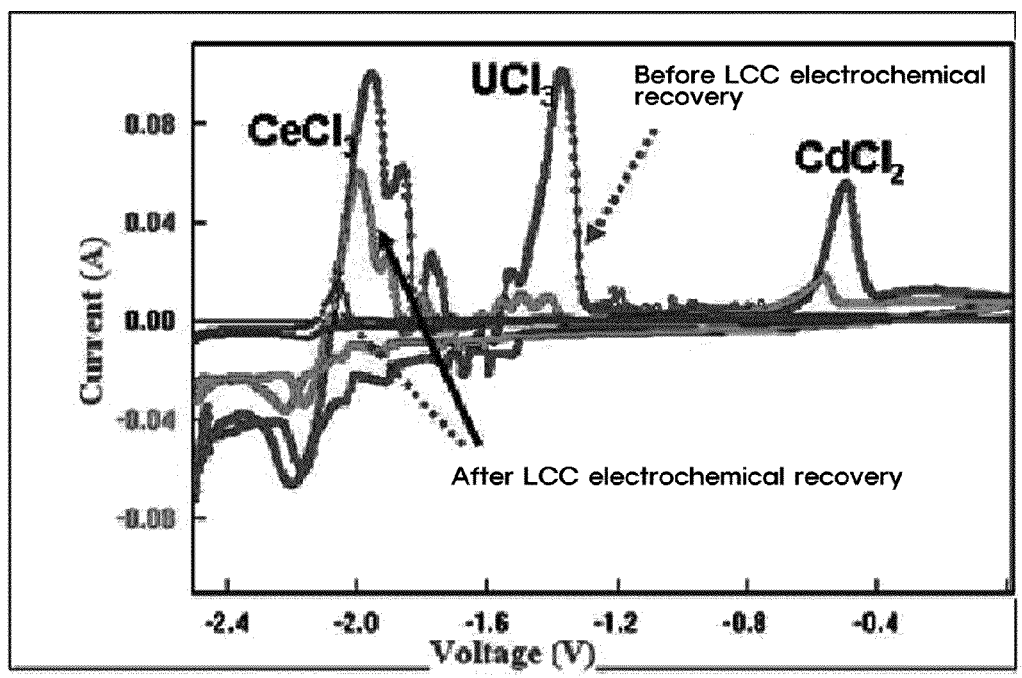
FIG. 3 is a graphical representation showing experimental results of variation in CV peaks measured in a molten salt phase before and after LCC electrochemical recovery as shown in FIG. 1.

Characteristics of LCC Electrochemical Recovery and Selective Oxidation of $CdCl_2$ for Recovery of Residual Actinide Element An experiment for recovering residual actinide elements in a waste molten salt was conducted by electro-depositing actinide elements in the molten salt on an LCC and electro-depositing the actinide elements at a current density of 10 to 100 mA/cm$^2$ until a residual concentration of the actinide elements is decreased to 100 ppm or less, and then, measuring cyclic voltammetry CV (see FIG. 3). Afterward, most rare-earth metals excessively co-deposited on the LCC were oxidized and extracted by adding a $CdCl_2$ oxidant to the molten salt.

Figure 4:
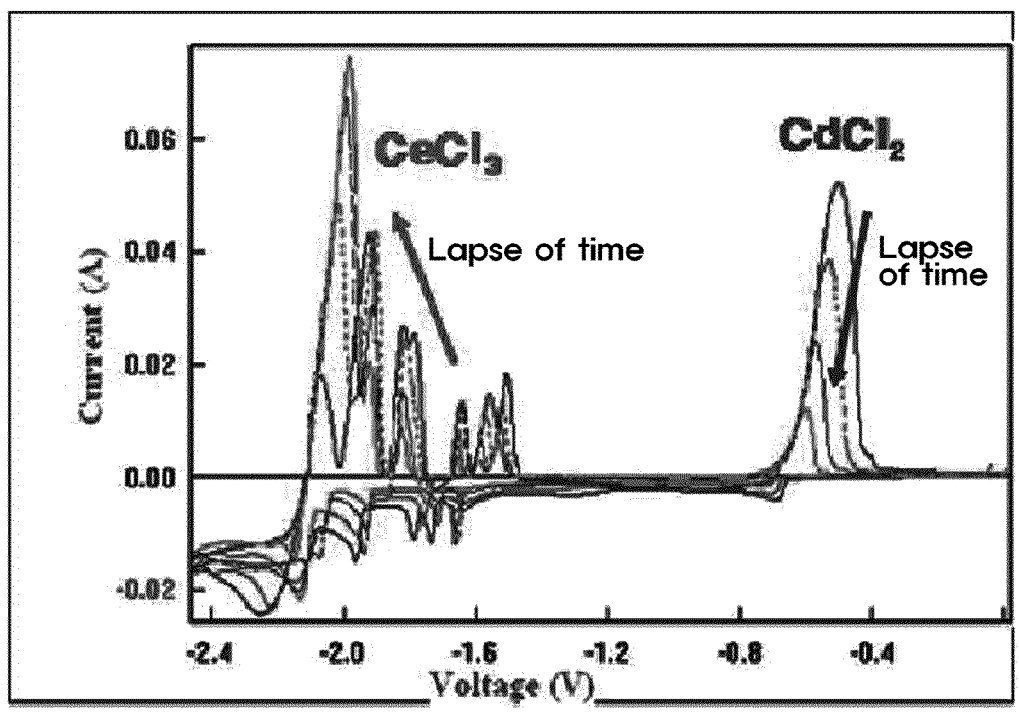
FIG. 4 is a graphical representation showing experimental results of variation in CV peaks measured in a molten salt phase during selective oxidation of $CdCl_2$ as shown in FIG. 1.

For the selective oxidation of $CdCl_2$ process, a change in amount of actinide elements and rare-earth metals in the molten salt was determined using CV by each interval of 30 minutes and a variation in status of the molten salt was observed in real time, so as to determine progress of the reaction (see FIG. 4).

Figure 5:
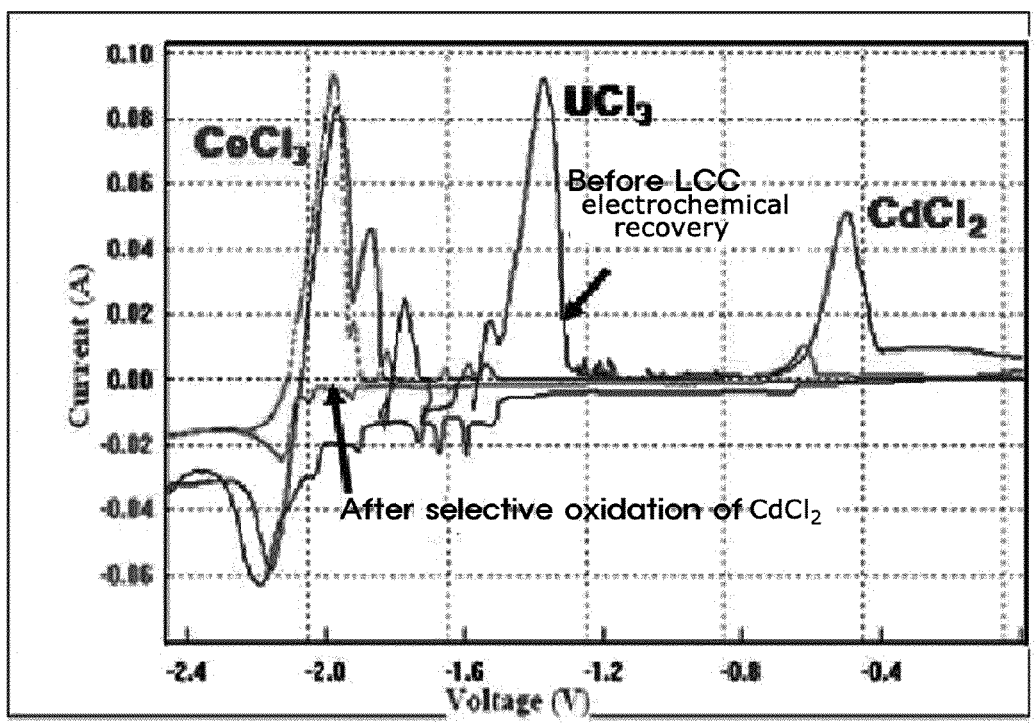
FIG. 5 is a graphical representation showing results of comparison between variation in CV peaks before LCC electrochemical recovery and after selective oxidation of $CdCl_2$ as shown in FIG. 1.

The electrochemical recovery experiment was conducted using five representative rare-earth elements such as Nd, Ce, Gd, La and Y as well as actinide elements. As a result of experiments for LCC electro-deposition under different conditions, preferable electrochemical recovery conditions were defined. With about 1.5 wt % concentration of the actinide elements and five rare-earth elements, the electrochemical recovery experiment was carried out using a glassy carbon anode at an agitation speed of 50 rpm and a current density of 30 mA/cm$^2$. From a result of ICP quantitative analysis and CV results measured by experiment, it was found that the residual concentration of actinide elements in the waste molten salt may be decreased to 100 ppm or less (see FIG. 5).

The selective oxidation experiment was conducted to determine a constitutional composition of the rare-earth element chloride generated in the molten salt depending on an amount of an oxidant added to the same molten salt electrolysis bath as used for electrochemical recovery of actinide elements, thereby evaluating the composition. For this purpose, RE metals only were selectively oxidized by stepwise increasing an amount of the $CdCl_2$ oxidant in the molten salt.

In order to decrease the residual concentration of actinide elements to 100 ppm or less by electro-depositing rare-earth elements as well as the actinide elements on the LCC, the molten salt was subjected to electro-deposition. Following this, the amount of the $CdCl_2$ oxidant was pre-metered to oxidize 50%, 75% and 90% of a total amount of the rare-earth elements co-deposited on the LCC and was stepwise added to the molten salt. From the experiment, it was found that the rare-earth metals only were selectively oxidized.

As a result of ICP quantitative analysis of metal concentration in the molten salt, it was found that controlling an amount of the added oxidant may favorably maintain the residual concentration of actinide elements to 100 ppm or less which is a target value of the foregoing experiment.

While the present invention has been described with reference to preferred embodiments, it will be understood by those skilled in the art that various modifications and variations may be made therein without departing from the scope of the present invention as defined by the appended claims.

What is claimed is:

1. A method for recovery of residual actinide elements from a chloride molten salt, comprising:
    conducting electrolysis using a liquid cadmium cathode (LCC) in a chloride molten salt that is formed after electro-refining and/or electro-winning of a spent nuclear fuel and that contains rare-earth elements as well as actinide elements;
    electro-depositing the actinide elements contained in the chloride molten salt on the LCC to reduce a concentration of the actinide elements in the chloride molten salt while co-electro-depositing rare-earth elements contained in the chloride molten salt on the LCC;
    stepwise adding a $CdCl_2$ oxidant to the chloride molten salt containing the LCC with co-deposited actinide and rare-earth elements to oxidize selectively only the rare-earth elements co-deposited with the actinide elements on the LCC, thereby forming rare-earth chlorides in the chloride molten salt; and
    recovering actinide elements deposited on the LCC.

2. The method according to claim 1, wherein the chloride molten salt is a LiCl—KCl eutectic salt.

3. The method according to claim 1, further comprising heating the chloride molten salt to 500 to 700° C. to melt the same, before the electrolysis process using the LCC in the chloride molten salt.

4. The method according to claim 1, wherein the electrolysis process using the LCC in the LiCl—KCl eutectic salt is conducted at a current density of 10 to 100 mA/cm$^2$.

* * * * *